E. H. DEWSON & T. R. BROWN.
CAR AND ELECTRIC COUPLING.
APPLICATION FILED JAN. 3, 1914.
1,225,786.
Patented May 15, 1917.
8 SHEETS—SHEET 3.
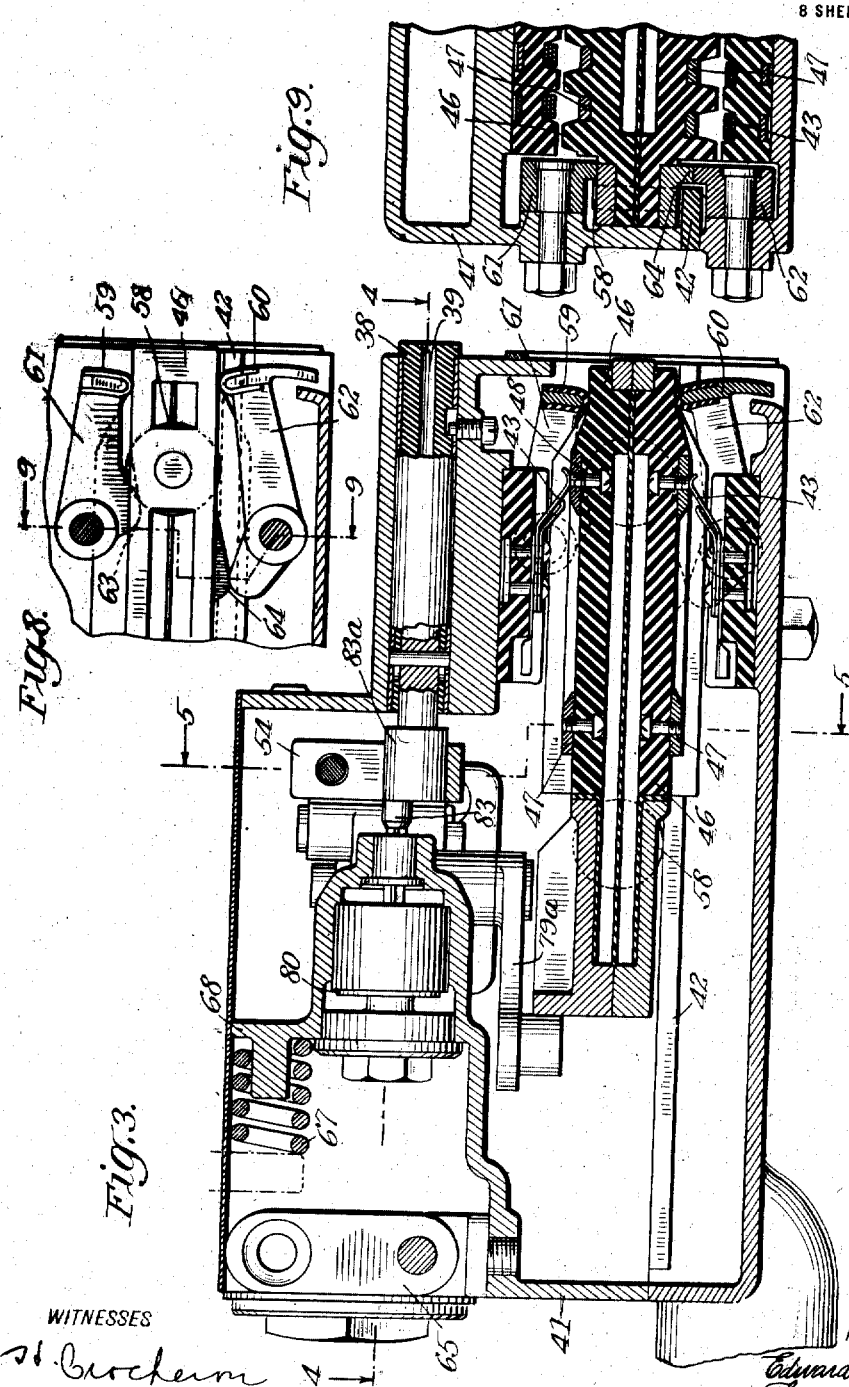

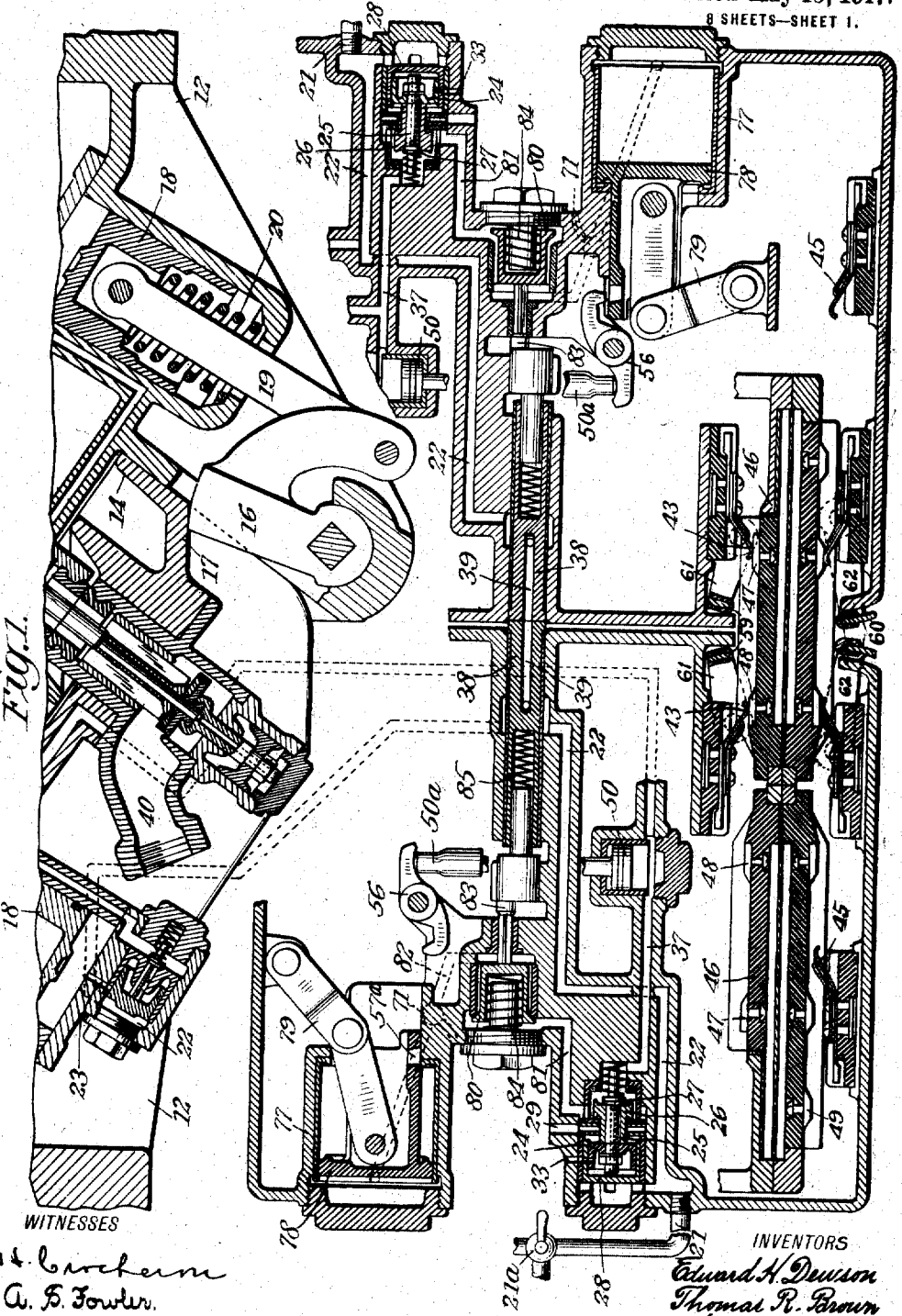

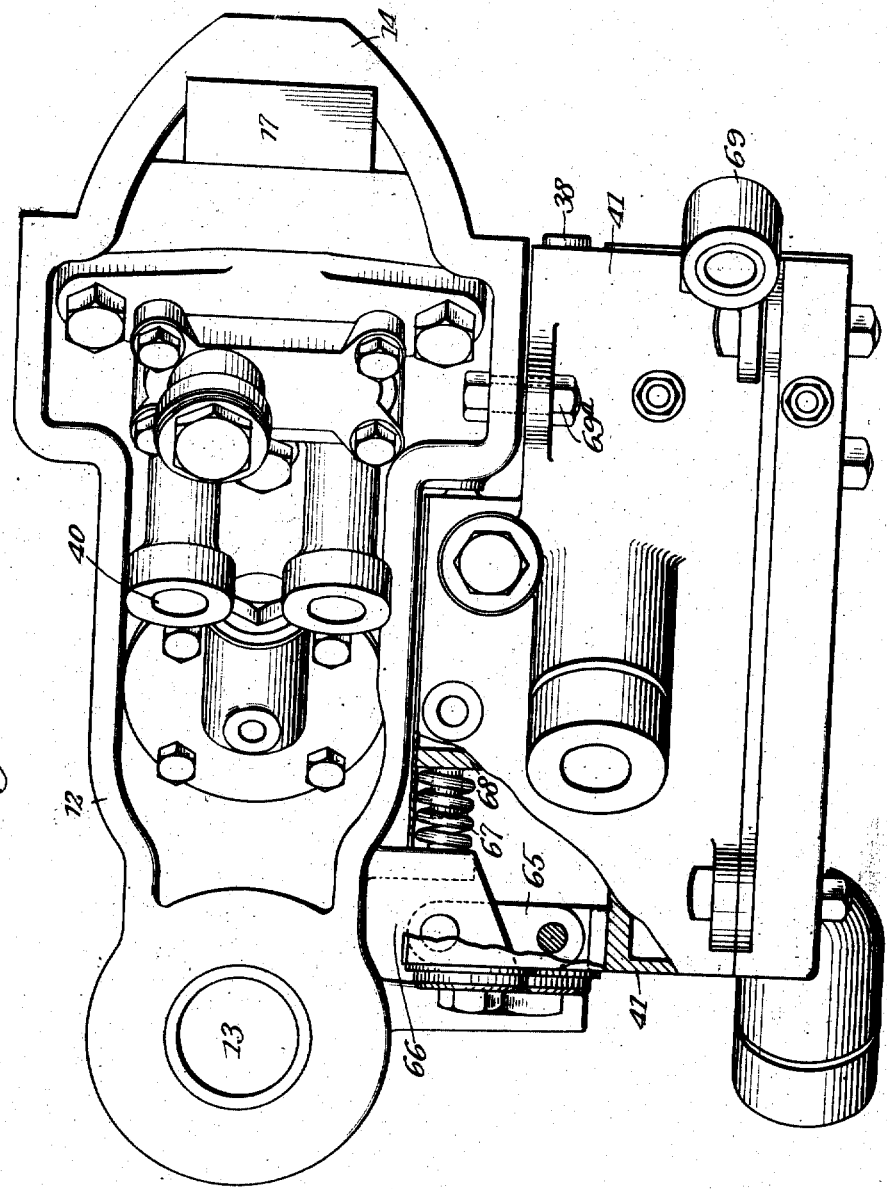

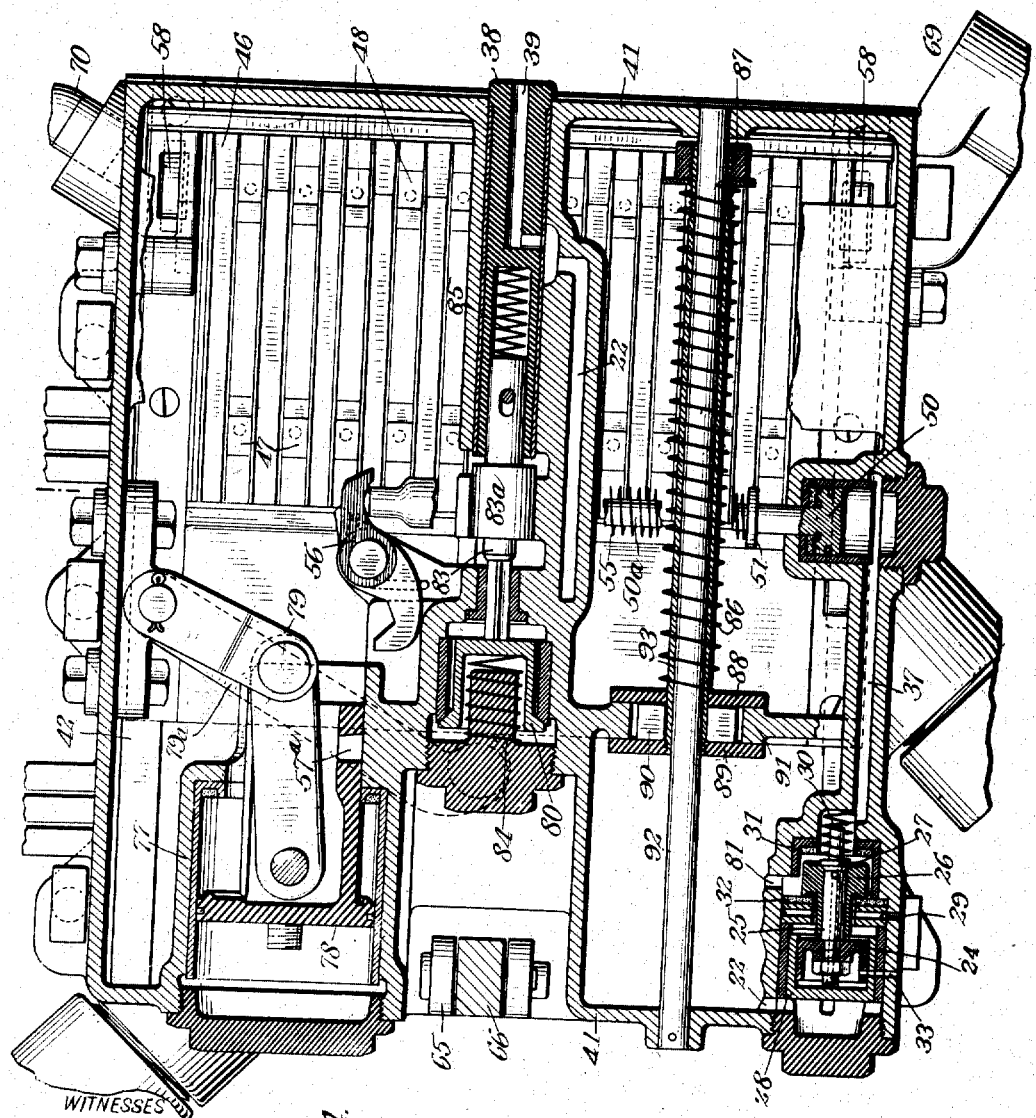

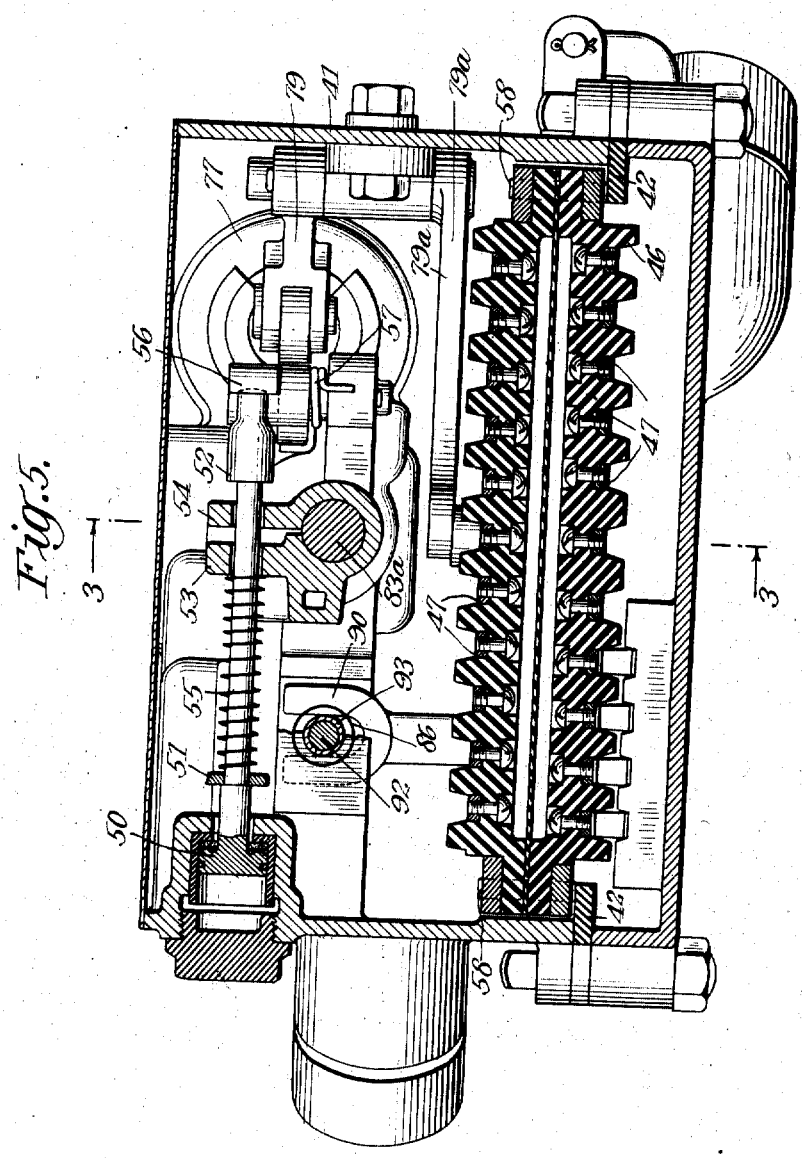

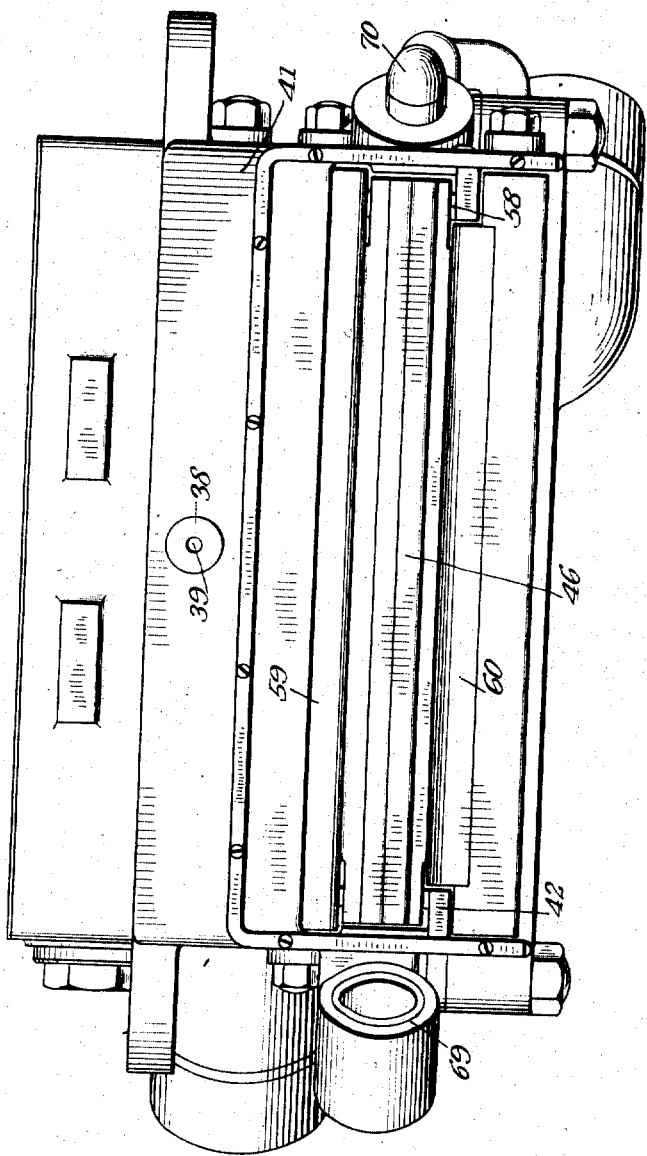

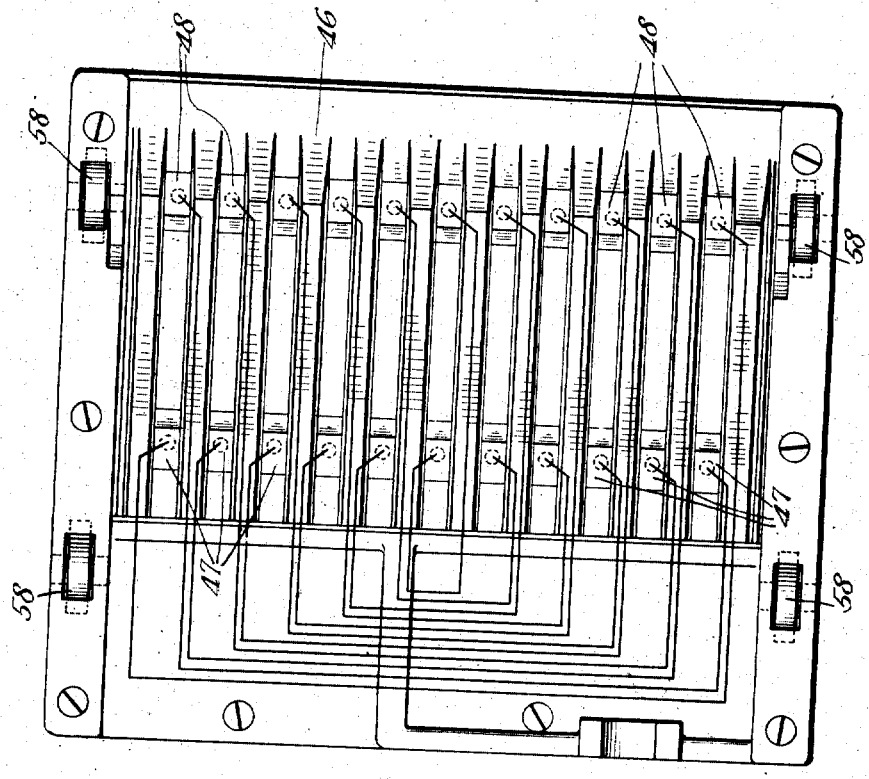

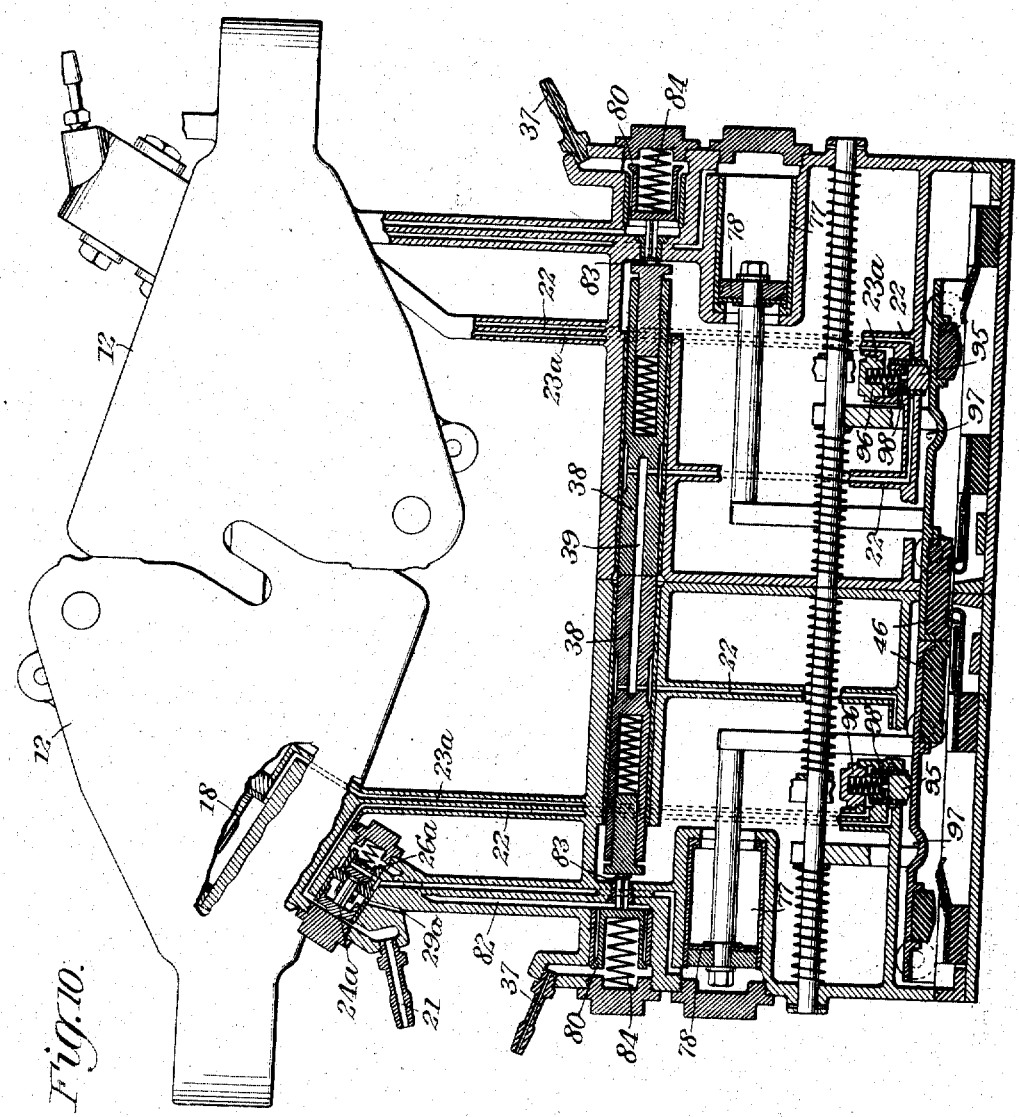

UNITED STATES PATENT OFFICE.

EDWARD H. DEWSON, OF NEW YORK, AND THOMAS R. BROWN, OF SPARKILL, NEW YORK, ASSIGNORS TO THE WESTINGHOUSE AIR BRAKE COMPANY, OF PITTSBURGH, PENNSYLVANIA, A CORPORATION OF PENNSYLVANIA.

CAR AND ELECTRIC COUPLING.

1,225,786.    Specification of Letters Patent.    Patented May 15, 1917.

Application filed January 3, 1914. Serial No. 810,112.

*To all whom it may concern:*

Be it known that we, EDWARD H. DEWSON, of the borough of Manhattan, in the city, county, and State of New York, and THOMAS R. BROWN, of Sparkill, in the county of Rockland and State of New York, have jointly invented a certain new and useful Improvement in Car and Electric Couplings, of which improvement the following is a specification.

This invention relates to car coupling devices and also to mechanism for automatically coupling the electric train line circuits between the cars or other vehicles of a train. One of the features of this improvement relates particularly to the type of combined car and electric couplings in which each counterpart coupler head is provided with an automatic locking device and fluid pressure actuated means for releasing the same at the time it is desired to uncouple and separate the cars. With this form of coupler it is necessary to release both of the locking devices of the adjoining coupler heads in order to uncouple and separate the cars, and one of the objects of this invention is to provide a fluid pressure conduit or communication between the releasing mechanism of both couplers whereby the same may be controlled and both locking devices be released by means of a valve upon either one of the cars.

Another feature of this improvement relates to the type of electric coupler in which each counterpart coupling head has a plurality of fixed contacts or fingers connected to the respective train line circuits, and a movable contact carrier adapted to be actuated to bridge over the space and electrically connect the corresponding contact fingers of the two couplers together. With this type of coupler, particularly where there is a relative lateral movement of the coupler heads in uncoupling, it is important that the movable contact carrier be withdrawn before the couplers are released and pulled apart, in order to avoid any liability of breakage or damage to the same, and another object of this invention is to provide means whereby said contact carrier shall be withdrawn before the couplers are released.

In a construction of this character it is sometimes desirable to withdraw the contact carrier after two cars have been coupled up together, but without releasing the couplers or pulling the same apart, and another feature of this invention comprises means for effecting the withdrawal of the contact carrier at any time, as desired, while the coupler heads remain locked together and without releasing the same.

Where the movable contact carriers are operated by fluid pressure, it is important that the positions to which said carriers are adjusted should not be affected by the accidental leakage or loss of the fluid pressure, and another feature of this invention comprises fluid pressure controlled means for locking the parts in position and preventing their accidental shifting in case of loss of pressure.

These and other features of this invention will be hereinafter more fully described and set forth in the claims.

In the accompanying drawings: Figure 1 is a diagrammatic section of a pair of couplers locked together, certain parts being broken away; Fig. 2, a side elevation of the improved coupler with a small portion broken away and indicated in section; Fig. 3, a vertical section of the electrical portion of the coupler taken substantially on the line 3—3 of Fig. 5; Fig. 4, a horizontal section of the same taken substantially on the line 4—4 of Fig. 3; Fig. 5, a transverse section taken on the line 5—5 of Fig. 3; Fig. 6, an end elevation; Fig. 7, a plan of the movable contact carrier illustrating in wiring diagram the connections between the contact bars; Fig. 8, a detail sectional view showing the pivoted shields for protecting the slide opening; Fig. 9, a transverse section of the same taken on the line 9—9 of Fig. 8; and, Fig. 10, a diagrammatic view partly in plan and partly in section, illustrating a modification.

According to the construction shown in the drawings, the coupler comprises a main casting or coupler head, 12, adapted to be secured by a pivotal connection, 13 to a draw bar, and having a hook shaped projection, 14, provided with a vertical plane surface inclined at an angle to the line of draft and adapted to engage and interlock with a corresponding surface on the projection of a counterpart coupler by a relative lateral movement when said couplers come together in the act of coupling. Each coupler head is also provided with a pivoted lock, 16, adapted to bear against a locking surface, 17, on the outer side of the projection, 14, of the counterpart coupler, and hold the couplers securely clamped together when in coupled position.

For the purpose of releasing the lock of the coupler, fluid pressure means are provided, comprising a cylindrical chamber formed in the coupler head and containing a piston, 18, which is connected by a rod, 19, with an arm of the pivoted lock 16, a spring, 20, acting on the back of the piston to normally hold the lock in its locking position. Fluid under pressure, such as compressed air, may be admitted through passage, 22, and port, 23, to the cylinder for actuating the piston, 18, to compress the spring and turn the pivoted lock, 16, to its releasing position when it is desired to uncouple and separate the couplers. Such a construction is set forth in the prior application of James S. Doyle and Frank Hedley, filed March 24, 1913, Serial No. 756,469.

With this form of rigid lock coupling it is necessary that both of the locks of the two counterpart couplers should be released in order that the same may be separated and the cars pulled apart, and according to one of the features of our present improvement, a fluid conduit is provided from either coupler to the releasing device of the other, so that whenever compressed air is admitted to the releasing cylinder of one coupler, it also flows through said conduit to the releasing cylinder of the other coupler and both locks are thereby released at substantially the same time to permit of a separation of the cars. Any suitable conduit between the couplers may be employed for this purpose, but it is preferred to form said conduit through the abutting tappets of an automatic electric coupling which may be attached to said coupler, and this comprises another feature of our improvement.

The casing, 41, for containing the electric contact devices is supported beneath the under side of the coupler head in such position that the adjacent ends of the two casings of the counterpart couplers meet together when coupled. In the casing, 41, are mounted a plurality of contact fingers, 43, preferably in a horizontal row, or a double row one above the other as shown in Fig. 1, near the outer end of the casing, and each connected with a corresponding wire of the train line circuits. Other sets of contact fingers, 45, may be employed for closing certain local circuits upon each car. In order to establish electrical connection between the respective contact fingers of the counterpart couplers, there is a sliding contact carrier, 46, mounted in the casing and having a plurality of sets of contact bars, 47 and 48, properly connected and adapted to engage the sets of contact fingers, 43, of the adjacent counterpart couplers when coupled together with one of the slides extended into the casing of the other coupler, whereby the contacts of the movable carrier bridge over the space between the said sets of contact fingers, as indicated in Fig. 1, and establish the desired electrical connection. The contact bars, 47 and 48, are preferably cross connected on opposite sides of the center line, as indicated in diagram in Fig. 7. Other contact bars, 49, shown in Fig. 1, may also be carried by the slide for establishing certain connections between the contact fingers, 45.

The contact carrier may be operated by any suitable means, but as herein shown, there is provided a cylinder, 77, containing a piston 78, connected to an arm, 79, fixed upon a vertical pivot pin carrying another arm, 79$^a$, for actuating the slide, 46, as shown more particularly in Figs. 3, 4, and 5, the supply of fluid to the cylinder being controlled by any suitable valve means, such as puppet valve, 80, governing the admission of fluid from passage, 81, to the port, 82, leading into the cylinder, 77, and the exhaust valve, 83, controlling the release from the cylinder to the atmosphere.

In order that the valve mechanism may be operated automatically by the coming together of the counterpart couplers, the valve, 80, is normally seated by a spring, 84, and abuts against the stem of the exhaust valve, 83, which is mounted on the stem or rod, 38, which extends longitudinally through the casing, preferably on the center line, and projects a short distance beyond the end of the casing in a position to abut against the end of the corresponding rod of the counterpart coupler when the same are brought together in the act of coupling. The exhaust valve, 83, may be slidably mounted on the rod, 38, with a yielding spring, 85, located between the same. As the two couplers come together, the rod, 38, is forced inward to open the valve, 80, and close the valve, 83, thereby admitting fluid to the piston, 78, to actuate the movable contact carrier to its outer position in which the train line circuits of the adjacent cars are coupled together. The device is designed so that one of the projecting rods shall yield and be forced inward before the other when the couplers come together, and with this arrangement, the slide, 46, is adapted to occupy a normal intermediate position with its end close to the opening in the casing when the couplers are separated, as indicated in Figs. 3 and 4. Each sliding contact carrier is provided with a bifurcated projection, 90, extending between the follower plates, 88, and 89, which engage the abutments, 91, formed on the casing, the follower, 89, being secured upon one end of a tubular stem, 93, mounted on the guide rod, 92, and having a nut, 87, fixed on its opposite end. The spring, 86, is mounted on the tubular stem, 93, between the nut, 87, and the follower, 88, and thus opposes the movement of the slide in either direction from its normal intermediate position. The force which opposes the yielding inward movement of the rod, 38, is due to the pressure of the spring, 84, and the fluid pressure acting on the back of the valve, 80, which is of a comparatively large area, and since these conditions are never precisely alike and exactly equal in all respects in any two counterpart couplers, it is evident that one of the valves of said couplers will start to yield before the other thereby cracking the joint of the valve upon its seat, and admitting pressure beneath the same which instantly balances the valve as to fluid pressure and thereby eliminates most of the opposing force. The corresponding rod then readily yields, being forced inward by the projecting rod of the counterpart coupling, and the piston, 78, moves the slide, 46, outward through the narrow opening and into the casing of the other coupler, where it engages the corresponding slide and forces the same back to its extreme inner position, as shown in Fig. 1 of the drawing. In this position the respective sets of contact fingers, 43, of the train line circuits are connected, while the local circuits, which are closed by contacts 45 and 49, in the intermediate position of the slide, are open.

In releasing the coupler, it is desirable that the sliding contact carrier should be withdrawn before the coupler locks are released and before the coupler heads begin to separate, and particularly so where the initial movement of the coupler heads relative to each other is, in a laterally inclined direction, as in the present case, and it is also desirable that the operator should be able to withdraw the slide during the time that the coupler heads are locked together and without uncoupling the same. According to this feature of our improvement, a valve device is provided for controlling the release of air from the actuating cylinder, 77, when the exhaust valve, 83, is closed. As shown in the drawings, one form of valve device for this purpose comprises a piston 24, having a perforated stem, 25, terminating in a small valve, 27, mounted within a larger puppet valve, 26, which is adapted to engage with either one of two seats, 31 and 32, upon opposite sides. A spring, 30, normally holds the small valve seated, and the larger valve against its seat, 32, thereby opening free communication from the supply passage, 37, to the passage, 81, and the valve, 80, and closing the outlet through exhaust port, 29. The piston head, 24, is mounted within the piston head, 28, and the admission of compressed air through the perforated stem into the space between said piston heads is controlled by the small valve, 27. The supply passage, 37, may communicate with the main reservoir pipe, 40, of the coupler.

When the parts are coupled together as indicated in Fig. 1, and it is desired to release the couplers, air under pressure controlled by a suitable cock, 21, on either vehicle, is admitted to the connection, 21, and passage, 22. This passage communicates by means of the port, 39, through the tappets, 38, with the corresponding passage in the counterpart coupler, and the air pressure thereby acts immediately upon the pistons, 28, of the valve devices of both couplers to close the valves, 26, against their respective seats, 31, and open the exhaust ports, 29. The supply of air from the main reservoir and the passage, 37, to the passages, 81 and 82, and the cylinder, 77, is thereby cut off by the closing of the valve, 26, and the air in cylinder, 77, of the coupler in which the valve, 80, is held open, and exhaust valve, 83, closed, by the tappets, 38, may then escape to the atmosphere through passages, 82, 81, and exhaust port, 29. This effects the release of air from the cylinder, 77, to which pressure had been admitted to actuate the piston, 78, and project the slide, and the springs, 86, thereupon return the slides to the normal release position. At the same time air passes through passages, 22 and 23, into the unlocking cylinders of both couplers by means of the connecting conduit, 39, and forces out the pistons, 18, against the springs, 20, and releases both locking levers, 16, thereby permitting the separation of the couplers. In order to insure the return movement of the slides before the releasing of the coupler locks, the capacity of passages, 22 and 23, leading into the unlocking cylinders, is somewhat restricted, thereby retarding the action of the unlocking pistons against the comparatively stiff springs, 20, until after the valve, 26, has exhausted the cylinder, 77, and the slide has been withdrawn. When the couplers are then pulled apart, the compressed air from passages, 22, and the cylinders escapes to the atmosphere and the parts return to a position ready for again coupling automatically when the couplers are brought together.

Under certain conditions, such as where there is a defect of some kind in the electrical connections, it may be desirable to withdraw the slide without unlocking the couplers, and for this purpose, fluid at a comparatively low pressure, less than that required to move the lock releasing pistons, 18, is admitted in any desired manner, as by setting cock, 21ª, to a different position, to the connection, 21, and passage, 22. This pressure acting on the large area of piston, 28, of the valve device is sufficient to unseat the small valve, 27, and admit the higher main reservoir pressure from the supply passage, 37, through the perforated stem into the space between the piston heads, 28 and 24, where it acts to move the same in opposite directions, and forces the valve, 26, against the seat, 31. This operates in the same manner as before described, to release the fluid from the cylinder, 77, and permit the springs to return the slides to normal position, but it will be noted that the degree of fluid pressure admitted in this instance, to the passages, 23, and the cylinders of the releasing pistons is insufficient to force said pistons outward to release the locks. Therefore, the couplers remain locked together and the train may then be run to the terminal or other place of repairs, with the slides withdrawn and the electric circuits disconnected. The couplers may then be unlocked and separated, by admitting the high main reservoir pressure into connection, 21, and passages, 22, where it acts to move over the piston heads, 28, and passes through ports, 23, into the unlocking cylinders, thus accumulating sufficient pressure to actuate pistons, 18, and release the locks. Then as the couplers are pulled apart all pressure from passages, 22, is vented through the open ports, 39, of the tappets and all the parts return to normal position as before described. A small leakage port, 33, may be provided from the space between the pistons, 24 and 28, to the atmosphere when said pistons are in the normal position, shown in Figs. 1 and 4, for the purpose of preventing the accidental accumulation of pressure in this space caused by leakage around said pistons which might otherwise produce an undesired movement of the valve. A cock, 71, located in the passage, 82, between the tappet valve, 80, and the cylinder, 77, may also be employed for cutting off the supply to the cylinder and exhausting the same to the atmosphere when it is desired to release the slides independently of the movement of the locks of the couplers.

Another feature of our improvement relates to means for preventing any accidental shifting of the tappet valves or slides, in case the air pressure, which normally holds these parts in their proper positions, should leak away and for this purpose there is provided a piston, 50, subject to the pressure from the main reservoir supply passage, 37, and having a stem, 50ª, provided with a shoulder, 51, extending through a fixed guide, 53, a spring, 55, being mounted on said stem between the guide and shoulder, and opposing the fluid pressure acting on the piston. The stem also engages a pivoted dog, 56, and has a shoulder, 52, for actuating a movable arm, 54, of a clamp, which surrounds the stem, 83ª, of the tappet exhaust valve, 83.

If, for any reason, the main reservoir pressure should leak away or become greatly reduced when the parts are coupled together, the spring, 55, will act to move the piston stem until the shoulder, 52, engages the arm, 54, and clamps the valve stem, 83ª. At the same time the spring, 57, actuates the dog, 56, upon its pivot so that the hooked end thereof engages the notch, 57ª, in the piston, 78, that has moved out to project its slide and locks the same in its outer position, all as shown more particularly in Figs. 4 and 5. This prevents any undesired movement or displacement of the tappet valves, the carrier or slide which has been projected and its actuating piston during such time as the fluid pressure may have been reduced by leakage or otherwise, and until the same is sufficiently replenished to cause the piston, 50, to compress its spring, 55, thus withdrawing the pivoted dog, 56, and releasing the clamp, 54.

For the purpose of protecting the opening at the face of the casing, 41, through which the sliding contact carrier, 46, extends, we provide vertically swinging shutters, 59 and 60, above and below said slide, and having at their ends, the respective arms, 61 and 62, pivotally supported upon the side walls of the casing. The contact carrier is preferably provided at its sides with wheels or rollers, 58, which are mounted to roll upon the flanges, 42, secured to the sides of the casing. When the slides or carriers are in the normal position with the couplers separated, as shown in Figs. 3, 6, and 8, the upper shutter, 59, rests upon the top of the slide at its front end, and the lower shutter, 60, bears against the under surface of the front end of the slide, being held in said position by means of the cam surfaces, 64, on the slide, engaging the ends of the pivoted arms, 62. In this position the shutters cover the openings above and below the slide and prevent the entrance of dirt and moisture into the casing. When the couplers are brought together and one of the slides is projected forward into its coupled position, as shown in Fig. 1, the upper shutter is raised by the cam surface, 63, and the lower shutter is permitted to swing downward, thus allowing free movement of the slide.

The casing, 41, may be supported in any suitable manner from the coupler head, either rigidly or otherwise, but as shown in Figs. 2 and 3, said casing is bolted to the coupler at the forward end, and suspended therefrom at its rear end by a link, 65, pivoted to a lug, 66, with a spring, 67, bearing between said lug and a wall or projection, 68, of the casing, 41. The bolts, 69ª, at the forward part of the casing may be slightly loose so that the spring and link support provides for a slight flexibility or relative movement between the casing and the coupler head. Each casing, 41, may also be provided with socket piece, 69, and a projecting stem, 70, upon opposite sides of the forward end, said stem and socket being inclined at an angle to the longitudinal axis of the coupler to correspond with the inclination of the locking plane of the couplers and guide the casings of the counterpart couplers together when the same are brought together for coupling.

According to the modification shown in diagram in Fig. 10, the valve device for controlling the release of the slides is located between the tappet valve, 80, and the slide actuating cylinder, 77; the valve, 26ª thus controls the passage, 82, normally permitting free communication through said passage from the tappet valve to the cylinder, but adapted to close said communication and vent air from the cylinder through exhaust port, 29ª, to the atmosphere when fluid pressure is admitted through connection, 21, and passage, 22, to the face of the piston, 24ª, which actuates the valve.

In order to prevent the release of the coupler locks before the return of the slides to normal position, we have shown in this modification a valve governed by the movement of the slides for controlling the passage leading to the unlocking cylinders. This valve, 95, is in the form of a round headed plunger resting on the slide, 46; and having a spring, 96, pressing the valve against the slide. When the slides occupy the coupled position, as indicated in Fig. 10, the valves, 95, are held up in such position as to close communication from the passage, 22, to the port, 23ª, and the unlocking cylinders, and to open the exhaust port, 98. When however, the slides are returned to their normal positions the recess, 97, is brought in line with the valve, and the spring forces the same down thereby closing the exhaust port and opening free communication from passage, 22, to the port, 23ª, and the unlocking cylinder. By means of this interlocking feature, it is impossible for the fluid pressure to reach the unlocking pistons, 18, until the slides have returned to normal position.

In the coupling up operation the action is substantially the same as before described, one of the tappet valves opens to admit pressure from the supply passage, 37, through passage, 82, to the slide projecting cylinder, 77, of one of the couplers, thus actuating the slides, 46, to make the electric train line connections. When it is desired to release the couplers, fluid pressure is admitted by a suitable cock on either vehicle to the pipe connection, 21, and thence flows by passage, 22, and the bore, 39, of tappet, 38, to the corresponding passages of the counterpart coupler, moves the corresponding valve, 26ª, against its spring, and thereby releases the pressure from the cylinder, 77, and allows the slides to return, by means of their springs, to normal position. The valves, 95, then move to open position, and supply fluid to the unlocking cylinders of both couplers, and the same may then be pulled apart, after which the pressure escapes from passages, 39 and 22, and the pistons, 24ª, and valves, 26ª, return to normal position.

Having now described our invention, what we claim as new and desire to secure by Letters Patent is:

1. In a car coupling, the combination with a casing containing a plurality of fixed contacts connected to train line circuits, and a movable carrier having corresponding contact bars, of fluid pressure means for projecting said carrier to electrically connect the corresponding contacts of counterpart couplers, and a valve device for controlling the return movement of said carrier.

2. In a car coupling, the combination with a casing containing a plurality of fixed contacts connected to train line circuits, and a movable carrier having corresponding contact bars, of fluid pressure means for projecting said carrier to electrically connect the corresponding contacts of counterpart couplers, and means carried by each coupler for controlling the return movement of the contact carrier upon either one of the couplers.

3. In a car coupling, the combination with a casing containing a plurality of fixed contacts connected to train line circuits, and a movable carrier having corresponding contact bars, of fluid pressure means for projecting said carrier to electrically connect the corresponding contacts of counterpart couplers, and a manually controlled valve device for releasing fluid from said fluid pressure means to effect a return movement of said carrier.

4. In a car coupling, the combination with a casing containing a plurality of fixed contacts connected to train line circuits, and a movable carrier having corresponding contact bars, of fluid pressure means for projecting said carrier to electrically connect the corresponding contacts of counterpart couplers, a valve device for controlling the release movement of said carrier and a conduit establishing communication between said valve devices of the counterpart couplers.

5. In a car coupling, the combination with a casing containing a plurality of fixed contacts connected to train line circuits, and a movable carrier having corresponding contact bars, of fluid pressure means for projecting said carrier to electrically connect the corresponding contacts of counterpart couplers, a valve operated automatically upon the coming together of the couplers for supplying fluid pressure to said means, and a manually controlled valve device for releasing fluid therefrom to effect a return movement of said carrier.

6. In a car coupling, the combination with a casing containing a plurality of fixed contacts connected to train line circuits, and a movable carrier having corresponding contact bars, of mechanism operating automatically when the couplers are brought together for projecting said carrier to electrically connect the corresponding contacts of counterpart couplers, and a manually controlled fluid pressure device for effecting a return movement of said carrier.

7. In a car coupling, the combination with a casing containing a plurality of fixed contacts connected to train line circuits, and a movable carrier having corresponding contact bars, of mechanism operating automatically when the couplers are brought together for projecting said carrier to electrically connect the corresponding contacts of counterpart couplers, and a fluid pressure valve device upon either car for controlling the return movement of the carrier of either of the counterpart couplers.

8. In a car coupling, the combination with a casing containing a plurality of fixed contacts connected to train line circuits, and a movable carrier having corresponding contact bars, of a cylinder and piston for projecting said carrier to electrically connect the corresponding contacts of counterpart couplers, an automatic tappet valve for controlling the supply of fluid to said cylinder, and a manually controlled valve device for cutting off the supply to and releasing fluid from said cylinder to effect a return movement of the carrier.

9. In a car coupling, the combination with a casing containing a plurality of fixed contacts connected to train line circuit, and a movable carrier having corresponding contact bars, of a cylinder and piston for projecting said carrier to electrically connect the corresponding contacts of counterpart couplers, an automatic tappet valve for controlling the supply of fluid to said cylinder, and a manually controlled valve device for cutting off the supply to and releasing fluid from said cylinder to effect a return movement of the carrier, and a conduit establishing communication between said valve devices of the counterpart couplers when coupled together.

10. In a car coupling, the combination with a casing containing a plurality of fixed contacts connected to train line circuits, and a movable carrier having corresponding contact bars, of a cylinder and piston for projecting said carrier to electrically connect the corresponding contacts of counterpart couplers, a valve controlling the supply of fluid to said cylinder, a yielding tubular tappet adapted to abut against a corresponding tappet of a counterpart coupler for actuating said valve, a manually controlled valve means for releasing fluid from said cylinder, and a conduit extending through said tappets and establishing communication between the valve means of the counterpart couplers.

11. In a car coupling, the combination with a casing containing a plurality of fixed contacts connected to train line circuits, and a movable carrier having corresponding contact bars, of mechanism operating automatically when the couplers are brought together for projecting said carrier to electrically connect the corresponding contacts of counterpart couplers, a yielding tubular tappet adapted to abut against a corresponding tappet of a counterpart coupler for actuating said mechanism, a manually controlled fluid pressure device for effecting a return movement of said carrier, and a conduit extending through said tappets and establishing communication between the fluid pressure devices of the counterpart couplers.

12. In a car coupling, the combination of a coupler head, a movable lock, a fluid pressure device for releasing said lock, electrical contacts connected to train line circuits, a movable carrier having corresponding contact bars, means for projecting said carrier to electrically connect corresponding contacts of counterpart couplers, a hollow tappet adapted to abut against the tappet of a counterpart coupler for actuating said means, and a conduit extending through said tappets and connecting the fluid pressure devices of the counterpart couplers.

13. In a car coupling, the combination of a coupler head, a movable lock, a fluid pressure device for releasing said lock, electrical contacts connected to train line circuits, a movable carrier having corresponding contact bars, means for projecting said carrier to electrically connect corresponding contacts of counterpart couplers, another fluid pressure device controlling the return movement of the carrier, and manually controlled means for supplying fluid to first return the carrier and then release said coupler lock.

14. In a car coupling, the combination of a coupler head, a movable lock for the same, an unlocking piston for releasing said lock, electrical contacts connected to train line circuits, a movable carrier having corresponding contact bars, a cylinder and piston for projecting said carrier to electrically connect corresponding contacts of counterpart couplers, and means for first releasing fluid from said cylinder to effect the return movement of said carrier and then admit fluid to actuate said unlocking piston.

15. In a car coupling, the combination with a casing containing a plurality of fixed contacts connected to train line circuits, and a movable carrier having corresponding contact bars, of a cylinder and piston for projecting said carrier to electrically connect the corresponding contacts of counterpart couplers, a valve for releasing fluid from said cylinder, a piston for actuating said valve and a manually operated cock for admitting fluid pressure to said actuating piston.

16. In a car coupling, the combination with a casing containing a plurality of fixed contacts connected to train line circuits, and a movable carrier having corresponding contact bars, of a cylinder and piston for projecting said carrier to electrically connect the corresponding contacts of counterpart couplers, a valve for cutting off the supply and releasing fluid from said cylinder, a compound piston having one head mounted within the other for actuating said valve and a small valve actuated by the preliminary movement of the larger head for admitting pressure to the space between said piston heads.

17. In a car coupling, the combination with a casing containing a plurality of fixed contacts connected to train line circuits, and a movable carrier having corresponding contact bars, of a cylinder and piston for projecting said carrier to electrically connect the corresponding contacts of counterpart couplers, a valve mechanism operated automatically by the coming together of the counterpart couplers for controlling the fluid pressure in said cylinder, and a device governed by the fluid pressure for locking said valve mechanism in position when the pressure diminishes below a predetermined point.

18. In a car coupling, the combination with a casing containing a plurality of fixed contacts connected to train line circuits, and a movable carrier having corresponding contact bars, of a cylinder and piston for projecting said carrier to electrically connect the corresponding contacts of counterpart couplers, a valve mechanism operated automatically by the coming together of the counterpart couplers for controlling the fluid pressure in said cylinder, means for locking said valve mechanism and the piston in the open position, and a device subject to the fluid pressure for actuating said locking means.

19. In a car coupling, the combination of a casing having an opening and containing electrical contacts connected to train line circuits, a movable carrier having corresponding contact bars, mechanism for projecting said carrier through said opening to electrically connect corresponding contacts of counterpart couplers, and a movable shutter for protecting said opening when the carrier is withdrawn.

20. In a car coupling, the combination of a casing having an opening and containing electrical contacts connected to train line circuits, a movable carrier having corresponding contact bars, mechanism for projecting said carrier through said opening to electrically connect corresponding contacts of counterpart couplers, and movable shutters operated by the movement of the carrier for protecting said opening when said carrier is withdrawn.

In testimony whereof we have hereunto set our hands.

EDWARD H. DEWSON.
THOMAS R. BROWN.

Witnesses:
 HOWARD HIPKINS,
 EDWARD A. WRIGHT.